Figure 1:
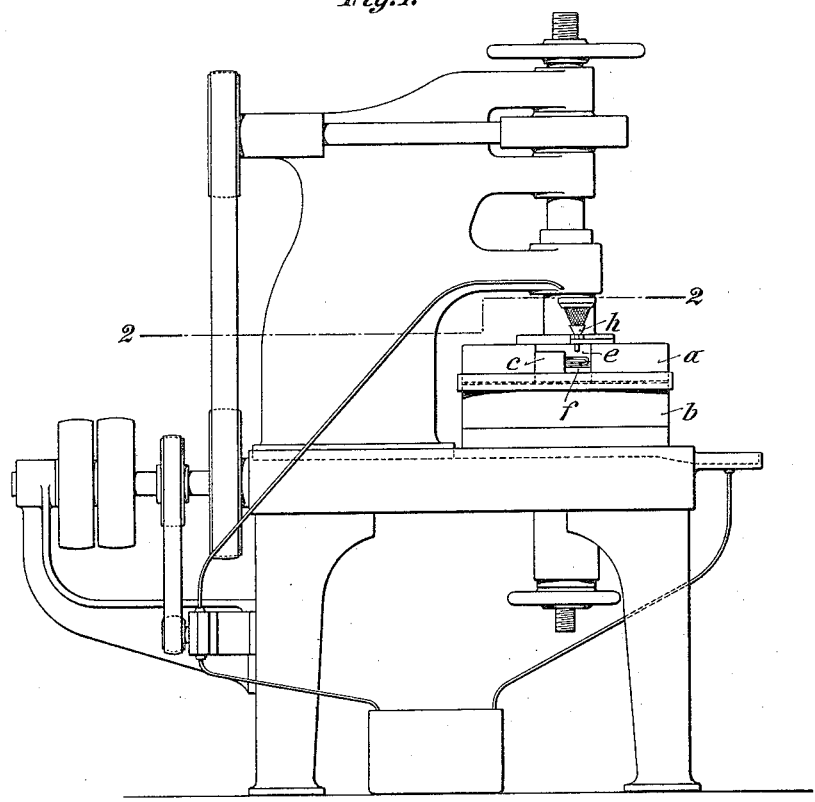

B. EITNER.
BALL GRINDING MACHINE.
APPLICATION FILED DEC. 31, 1910.

1,036,590.

Patented Aug. 27, 1912.
4 SHEETS—SHEET 1.

WITNESSES:
Fred White
Rene Bruine

INVENTOR:
Berthold Eitner,
By Attorneys,
Fraser Gurk & Myers

B. EITNER.
BALL GRINDING MACHINE.
APPLICATION FILED DEC. 31, 1910.

1,036,590.

Patented Aug. 27, 1912.
4 SHEETS—SHEET 4.

WITNESSES:
Fred White
René Bruine

INVENTOR:
Berthold Eitner,
By Attorneys,
Fraser Turk & Myers

COLUMBIA PLANOGRAPH CO., WASHINGTON, D. C.

UNITED STATES PATENT OFFICE.

BERTHOLD EITNER, OF BERLIN, GERMANY, ASSIGNOR TO DEUTSCHE WAFFEN- UND MUNITIONSFABRIKEN, OF BERLIN, GERMANY.

BALL-GRINDING MACHINE.

1,036,590.

Specification of Letters Patent.  Patented Aug. 27, 1912.

Application filed December 31, 1910.  Serial No. 600,290.

*To all whom it may concern:*

Be it known that I, BERTHOLD EITNER, workmaster, a subject of the King of Prussia, residing at No. 14 Gotzkowskystrasse, Berlin, in the Kingdom of Prussia, Germany, have invented certain new and useful Improvements in and Relating to Ball-Grinding Machines, of which the following is a full, clear, and exact description.

As is known in ball-grinding machines in order to obtain circular balls of uniform size the balls must be subjected to a frequent and thorough mixing during the grinding process. For this purpose each individual ball is constantly caused to change its axis of rotation, its position between the other balls and also its grinding channel, in such a manner that as far as possible all the balls assume another position and order in another grinding channel after each circuit. Heretofore, especially in the case of ball grinding machines the grinding plates of which are formed with concentric annular channels, mixing of the balls has been effected owing to the fact that the balls running in the grinding channels were conveyed out of the grinding channels into a recess in one of the grinding plates, conducted into special mixing devices and then after being mixed returned by special conveyer members into the grinding channels of the grinding plates, it being necessary to impart to the balls situated outside the grinding plates an acceleration corresponding to the speed of the grinding plates in order to prevent them from being retarded relatively to the grinding plates, that is to say, in order to obtain a uniform driving or movement by the rotating grinding plates of the balls which are returned and thus insure the complete replenishment of the grinding channels that have previously been emptied.

The present invention relates to a ball grinding machine in which the mixing of the balls is regulated exactly in accordance with the speed of the grinding plates for the time being, in such a manner that the employment of special conveyer members and also the necessity for acting upon the balls or their conveyer members for producing an acceleration of the balls when they are re-introduced is rendered unnecessary.

In accordance with the invention the balls are discharged from the grinding channels, mixed, and returned to the grinding channels, inside the recess in the grinding plates and automatically by the driving force of the rotating plates so that the displacement of the balls is produced in constant agreement with the speed of the grinding plates, without the assistance of conveyer or acceleration members. This improvement also renders it possible for the balls running in the grinding channels to remain constantly in contact with the grinding medium supplied continuously at an appropriate place (to the ball mixing chamber for example) during the whole of the grinding operation that is to say during the mixing which takes place in the machine itself. This arrangement presents the advantage that the so-called "drumming" of the balls, that is to say, the subsequent treatment of the ground balls in drums filled with grinding material is rendered unnecessary, thereby greatly simplifying and shortening the entire process of manufacturing the balls.

Figure 2:
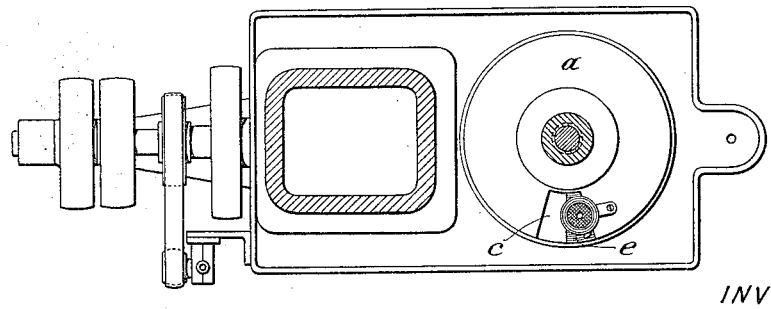
Figure 3:
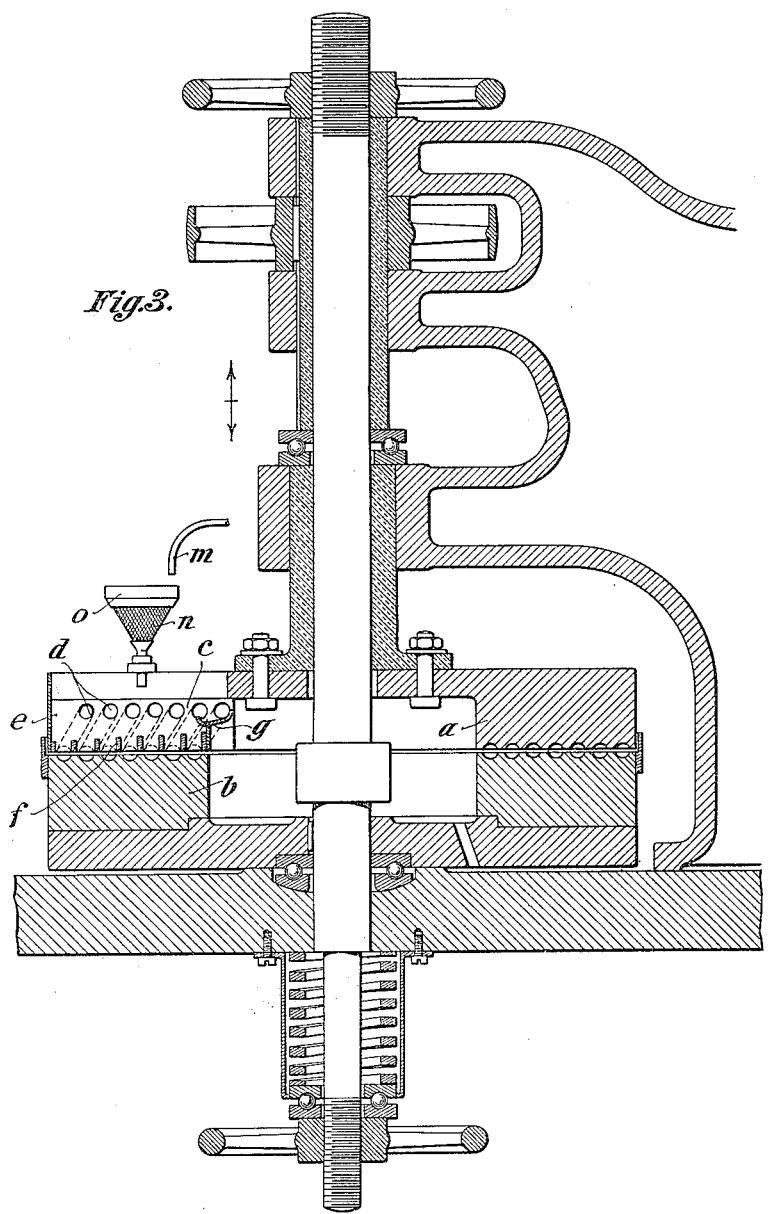
Figure 4:
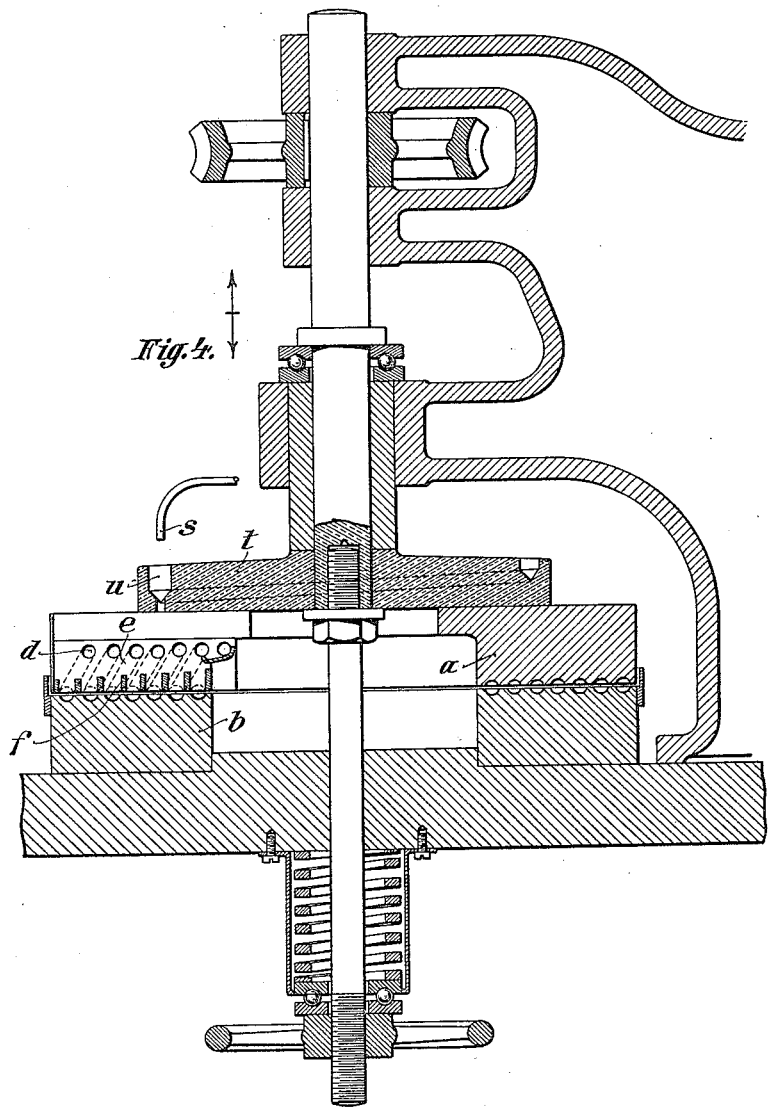
Figure 5:
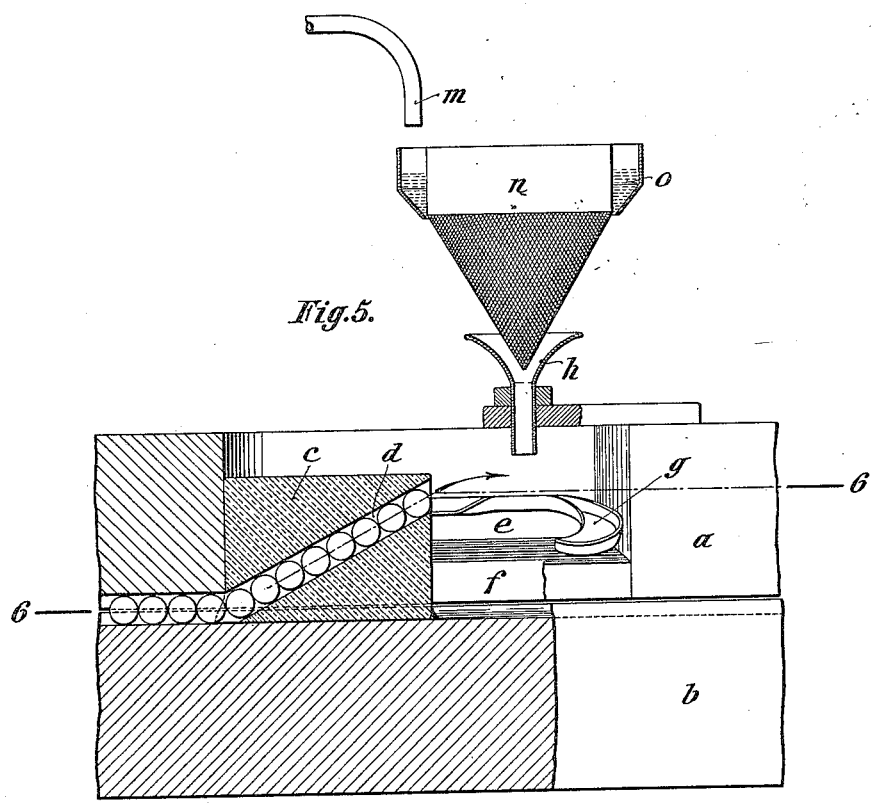
Figure 6:
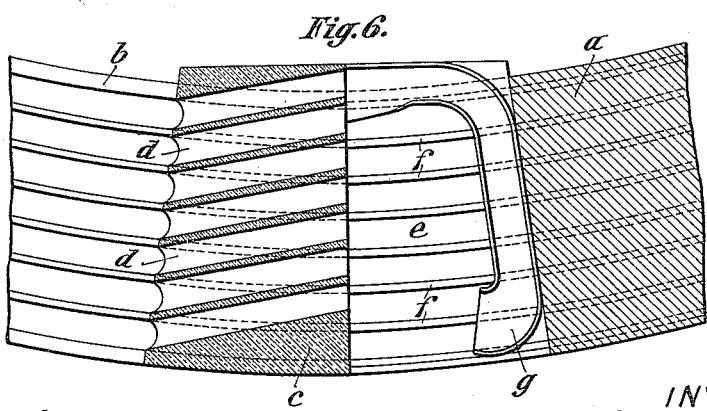

Two embodiments of the invention are illustrated by way of example in the accompanying drawings in which:

Figure 1 is an elevation of the ball grinding machine. Fig. 2 is a sectional plan on the line 2—2 in Fig. 1. Fig. 3 is a vertical section through the upper part of a machine with rotary lower grinding plate. Fig. 4 is a corresponding section of a machine with rotating upper grinding plate. Figs. 5 and 6 illustrate the ball mixing device separately to a larger scale, Fig. 5 being a longitudinal section and Fig. 6 a plan in section on the line 6—6 of Fig. 5.

Both the grinding plates are formed with concentric annular channels and the upper plate $a$ is removable from the lower plate $b$ in a vertical direction. During operation the plates are pressed one against the other by adjustable spring pressure.

A guide member $c$ is arranged in a recess in the upper plate $a$ and comprises passages $d$ leading obliquely upward; these passages connect below with the annular grooves in the grinding plates and open above staggered relatively to these annular grooves into the chamber $e$ which behind the guide members $c$ remains free in the recess in the plates above the channels of the plate $b$. A circulation path $g$ connects with the innermost passages $d$ of the guide member and leads to the outermost passages. The chamber $e$ is preferably sub-divided into separate chambers below by means of partitions *f* which fit against the walls of the channels in the plate *b*. As the channels increase in size from the interior toward the exterior, the channels situated toward the exterior contain more than the inner channels. In order to insure uniform charging of all the channels, the partitions *f* decrease step by step in height toward the exterior.

The apparatus operates in the following manner: No matter whether the lower or the upper plate rotates the balls running into the channels of the lower and upper plates are raised out of the channels after each revolution by the guide member *c* through the passages *d* of which they are conducted obliquely upward until under the pressure of the following balls they fall out of these passages through the chamber *e* into the channels of the lower plate by which they are carried along. Owing to the inclination of the passages *d* to the channels the balls are deflected in such a manner that when they again come between the grinding plates they enter different channels. In addition to this in the chamber *e* they fall over and through each other so that their relative position, their axis of rotation and their order are changed. The balls therefore receive the movements required for their change of position exclusively by the driving force of the rotating grinding plates. The intensity of these movements therefore always corresponds with the speed of the grinding plates so that no adjustment of the apparatus in correspondence with the speed of the grinding disks is necessary. Special conveyer and accelerating means are likewise unnecessary as the balls fall directly at the feed place. The apparatus is much smaller and simpler and more certain in its operation than prior apparatus because of the omission of all conveyer mechanism which increases the risk of interruption of the operation.

In the machine in which the lower plate is rotary (Figs. 3 and 5) the device for feeding and mixing the grinding medium consists broadly of the reservoir *n* provided with a hopper-shaped sieve bottom, the annular reservoir *o* which tapers downward and which fits the upper part of the reservoir *n* while leaving a narrow annular interval at its lower part, and of the discharge hopper *h* which projects directly into the ball mixing chamber *e*. The reservoir *n* is filled with the grinding medium such as emery powder for example, while the second reservoir *o* surrounding the upper part of the reservoir *n*, serves for the reception of the liquid (oil, petroleum or the like) which is supplied to this reservoir through the pipe *m*. The liquid contained in this reservoir flows through the open space at the bottom trickles over the sieve-like bottom of the reservoir *n* and thus washes the grinding powder out of the meshes of the sieve. The grinding mass thus formed falls into the discharge hopper *h* and finally passes through it into the ball mixing chamber *e*, that is to say between the grinding plates.

In the constructional form of the machine illustrated in Fig. 4 with a rotating upper plate the device for mixing and supplying the grinding medium consists of a plate *t* connected with the rotating upper plate and in which an annular groove *u* is cut; this groove runs obliquely to the plane of the plate and at its deepest part opens into the ball mixing chamber formed in the upper grinding plate *a*. A discharge pipe *s* is arranged above the annular groove *u* and through this pipe the liquid is conducted into the said passage. The passage *u* is partially filled with emery powder which is carried by the stream of liquid issuing from the outlet *s* toward the lower opening of the passage and through this into the ball mixing chamber *e* or between the grinding plates.

Owing to the coöperation of the two similar grinding members (cast iron plates) with a uniformly supplied pure and fine grinding medium, the balls manufactured are exactly equal in size, perfectly round smooth and free from all grinding ridges, or incisions, so that they require no subsequent treatment whatever.

What I claim as my invention and desire to secure by Letters Patent is:

1. In a machine of the character described, the combination of two grinding plates, movable relatively to one another and one of which has a recess therein, grinding grooves in the grinding faces of said plates, and a guide member in said recess, leaving a space at the rear thereof over the grinding grooves, adapted to lift balls out of said grinding grooves and deliver them to said space at the rear thereof.

2. In a machine of the character described, the combination of two grinding plates, movable relatively to one another and one of which has a recess therein, grinding grooves in the grinding faces of said plates, a guide member in said recess, leaving a space at the rear thereof over the grinding grooves, adapted to lift balls out of said grinding grooves and deliver them to said space at the rear thereof, said guide-member having upwardly extending guide passages therein.

3. In a machine of the character described, the combination of two grinding plates, movable relatively to one another and one of which has a recess therein, grinding grooves in the grinding faces of said plates, and a guide-member in said recess, leaving a space at the rear thereof over the grinding grooves, adapted to lift balls out of said grinding grooves and deliver them to said space at the rear thereof, said guide-member having upwardly obliquely extending guide passages therein and a circulation-path or runway from a guide passage to a grinding groove.

4. In a machine of the character described, the combination of two grinding plates, movable relatively to one another and one of which has a recess therein, grinding grooves in the grinding faces of said plates, and a guide member in said recess, leaving a space at the rear thereof over the grinding grooves, adapted to lift balls out of said grinding grooves and deliver them to said space at the rear thereof, said guide-member having partitions extending across said space in the rear of said member and corresponding with said grinding grooves in the lower plate.

5. In a machine of the character described, the combination of two grinding plates, movable relatively to one another and one of which has a recess therein, grinding grooves in the grinding faces of said plates and a guide-member in said recess, leaving a space at the rear thereof over the grinding grooves, adapted to lift balls out of said grinding grooves and deliver them to said space at the rear thereof, said guide-member having partitions extending across said space in the rear of said member and corresponding with said grinding grooves in the lower plate, the height of said partitions decreasing from one side of the series to the other, whereby balls may be distributed from one partitioned space to another.

6. In a machine of the character described, the combination of two grinding plates, movable relatively to one another and one of which has a recess therein, grinding grooves in the grinding faces of said plates, and a guide-member in said recess, leaving a space at the rear thereof over the grinding grooves, adapted to lift balls out of said grinding grooves and deliver them to said space at the rear thereof, and means for supplying a grinding medium adapted to discharge in said space.

7. In a machine of the character described, the combination of two grinding plates, movable relatively to one another and one of which has a recess therein, grinding grooves in the grinding faces of said plates, and a guide in said recess, leaving a space at the rear thereof over the grinding grooves, adapted to lift balls out of said grinding grooves and deliver them to said space at the rear thereof and means for supplying a grinding medium adapted to discharge in said space, said means comprising a hopper-shaped sieve for containing a grinding medium surrounded by a liquid reservoir from which liquid trickles onto said sieve.

In witness whereof, I have hereunto signed my name in the presence of two subscribing witnesses.

BERTHOLD EITNER.

Witnesses:
ROBERT MICHELSKY,
HENRY HASPER.

---

Copies of this patent may be obtained for five cents each, by addressing the "Commissioner of Patents, Washington, D. C."